July 24, 1962      S. B. COHN      3,046,503
BROAD-BAND WAVEGUIDE FILTER
Filed May 27, 1960      2 Sheets-Sheet 1
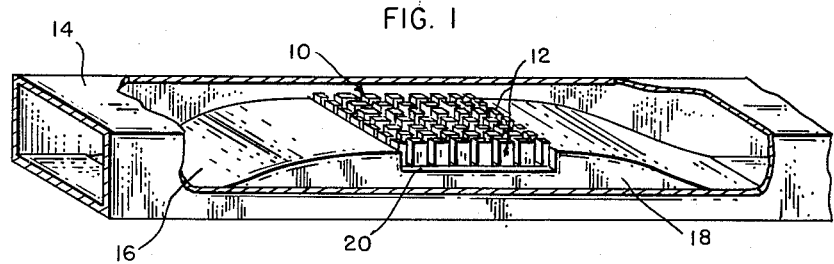
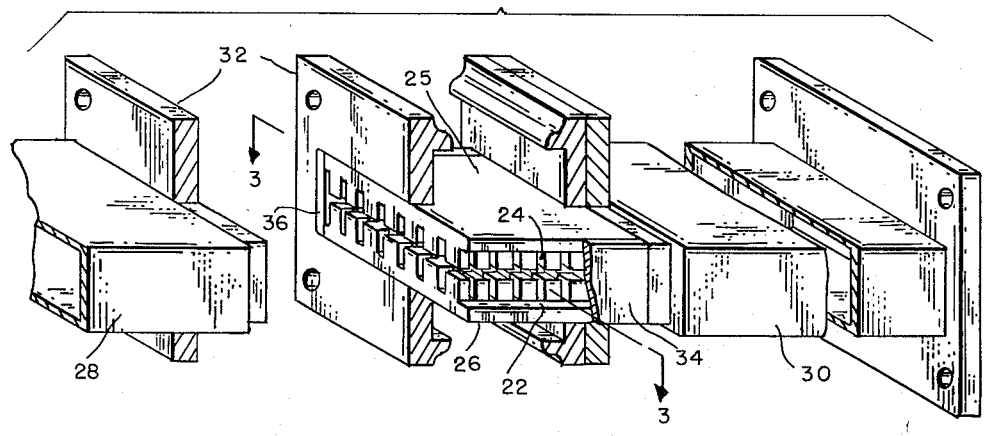
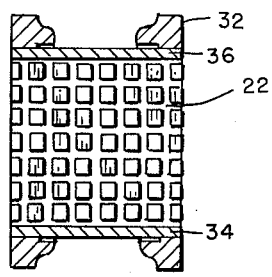
*INVENTOR,*
SEYMOUR B. COHN
BY
*Harry M. Saragovitz*
ATTORNEY.

July 24, 1962  S. B. COHN  3,046,503
BROAD-BAND WAVEGUIDE FILTER
Filed May 27, 1960  2 Sheets-Sheet 2

INVENTOR,
SEYMOUR B. COHN
BY
*Harry M. Saragovitz*
ATTORNEY.

3,046,503
BROAD-BAND WAVEGUIDE FILTER
Seymour B. Cohn, Palo Alto, Calif., assignor to the United States of America as represented by the Secretary of the Army
Filed May 27, 1960, Ser. No. 32,499
1 Claim. (Cl. 333—73)

This invention relates to broad-band waveguide filters and more particularly to an improved corrugated rectangular waveguide filter.

In the so called "varying impedances" class of waveguide filters, the height of the rectangular waveguide is stepped by means of transversely disposed ridges to give alternate high and low characteristic impedance regions and thus provide a low-pass filter type of cut-off. Such filters are known in the art as corrugated rectangular waveguide filters. The band-pass of this type filter extends from the cut-off frequency of the waveguide up to the cut-off frequency of the stepped filter structure. Above this second cut-off frequency it is generally desired that the stop band extend to as high a frequency as possible without spurious responses. However, it has been found that pass bands occur for the higher order $TE_{n0}$ modes whenever the guide wavelength of one of these modes is greater than the cut-off guide wavelength of the dominant mode. This in many cases causes spurious transmission regions in the desired stopband of the filter. While it is recognized that this type of spurious response can be eliminated by using two or more groups of filter sections in different width waveguides, such structures have proved rather difficult to construct and the discontinuities at the changes in width usually cause a poor band-pass response.

It is an object of the present invention to provide an improved filter structure of simpler design wherein the responses to higher waveguide modes is completely eliminated.

It is another object of the present invention to provide an improved corrugated type filter which is relatively easy to build and characterized by a very wide stop band free of spurious responses and an excellent band-pass response.

It is another object of the present invention to provide an improved corrugated waveguide filter having a filter response dependent on frequency rather than on the guide wavelength of any mode.

In accordance with one embodiment of the invention there is provided a broad-band filter which includes a rectangular waveguide, a pair of spaced transition sections within said waveguide and a high-frequency band-pass filter having a recessed base portion from which there extends upwardly a plurality of spaced bosses. In this embodiment the band-pass filter structure is unsymmetrical in the E-plane of the rectangular waveguide.

In accordance with another embodiment of the invention the band-pass filter includes a pair of mutually opposed surfaces each comprised of a plurality of spaced bosses. The opposing bosses are symmetrically arranged so that the band-pass filter is symmetrical in the E-plane of the waveguide.

For a better understanding of the invention, together with other and further objects thereof, reference is had to the following description taken in connection with the accompanying drawings in which:

FIG. 1 illustrates one embodiment of the invention, partially cut-away, showing the filter structure asymmetrical in the E-plane;

FIG. 2 illustrates another embodiment of the invention, partially cut-away, showing the filter structure symmetrically arranged in the E-plane;

FIG. 3 is a cross-section of the filter section taken along the line 3—3 of FIG. 2;

Figure 4:
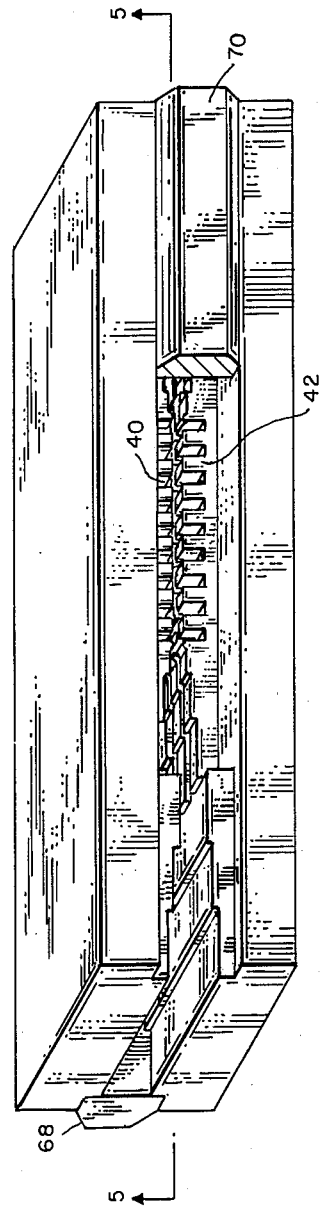
FIG. 4 is a perspective view, partially cut-away, showing a preferred filter structure symmetrically arranged in the E-plane.

Referring now to FIG. 1 of the drawing, the waveguide filter includes a metallic filter portion 10 positioned between the top and bottom walls of rectangular waveguide 14, and a first and second tapered transition section 16 and 18 connected respectively between one end of waveguide 14 and one end wall of the filter portion 10. The filter portion 10 comprises a plurality of rectangular shaped bosses 12 having a square or rectangular cross-sectional area and which extend upwardly from a base portion 20. As shown, the filter base portion 20 is recessed between the tapered transition sections. The bosses 12 are arranged colinearly in rows parallel to the longitudinal and transverse axes of waveguide 14. The rectangular shaped bosses 12 are formed by first cutting a prescribed number of spaced transverse slots having a prescribed width and depth and then cutting longitudinal slots of the same or other depth and width spacing. The longitudinal rows of bosses are uniformly spaced as are the transverse rows of bosses, with the spacing between longitudinal and transverse rows of bosses being of the same or different width and depth. The number of bosses in a transverse row across the guide 14 is a function of the accuracy and the required tolerances of the bosses and also a function of the width of the stop band desired. As shown, a transverse row of bosses terminates the filter portion 10 at both ends in the E-plane. The cross-sectional area of the bosses in the terminating ends are made less than the cross-sectional area of the remaining bosses in order to provide a better match to the tapered transition sections 16 and 18 so that the filter-image impedance remains substantially constant in the pass band. The longitudinal rows of bosses which respectively terminate the sides of the filter portion are spaced from the side walls of waveguide 14 by a distance which is substantially one-half the width of the longitudinal slots. The center-to-center distance between adjacent transverse rows of bosses is considered to be one full section of the filter portion 10. As shown, the transition from one end of filter portion 10 to one end of waveguide 14 is provided by the tapered section 16, while tapered section 18 provides the transition from the other end of filter portion 10 to the other open end of guide 14. It is to be understood, of course, that stepped transformers may be used in place of the smooth transition sections shown. The number of sections required for filter portion 10 is a function of the desired sharpness of cut-off above the upper frequency edge of the pass band.

FIGS. 2 and 3 illustrate a filter structure which is symmetrical in the E-plane. In FIGS. 2 and 3, two identical filter portions 22 and 24 are utilized with the bosses of one filter portion opposing the bosses of the other filter portion, and with the longitudinal and transverse slots of one filter portion being symmetrical with the respective longitudinal and transverse slots of the second filter portion. Since each of the filter portions 22 and 24 is identical in construction to the filter 10 shown in FIG. 1, a detailed description thereof is not necessary. The flat or base section 25 and 26 of each filter portion are oppositely disposed as shown. The two mutually opposed filter portions are spaced from each other and supported in position by any suitable means well known in the art. The complete filter is affixed to the transition waveguides 28 and 30 by means of flanges shown at 32. Side walls 34 and 36 are provided in the filter section, these walls being spaced from the first and last longitudinal row of bosses by a distance which is substantially one-half the width of the longitudinal or transverse slots. As shown, the side walls 34 and 36 are respectively affixed between the mounting flanges 32 of the filter portion shown in FIG. 2.

In order to better understand the operation of the improved filter shown in FIGS. 1 and 2, the filter may be considered first without the longitudinal slots, i.e., transverse slots only. Such transverse slots in the filters are characteristic of the conventional varying-impedance waveguide filter, and without the longitudinal slots, the structure does not vary across the width of the waveguide and, therefore, according to basic waveguide theory, the response of the structure is a function of guide wavelength $\lambda_g$ only for any $TE_{n0}$ mode. Thus, if the filter cuts off at $\lambda_{g1}$, for the $TE_{10}$ mode, it will also cut off at this same guide wavelength for the $TE_{20}$ mode, $TE_{30}$ mode, etc. Hence, for each mode there will be a pass band between the cut-off frequency of this mode, and the frequency at which the guide wavelength of this mode is equal to $\lambda_{g1}$.

The fact that the higher-mode responses do not occur in the filter having both transverse and longitudinal slots may best be seen by considering it to be a two-dimensional artificial dielectric. Each mode of the $TE_{n0}$ class may be assumed to consist of a pair of uniform plane waves travelling diagonally with respect to the longitudinal axis of the waveguide. Inside the filter structure, each plane wave will have a cut-off frequency below which the wave will travel freely, and above which it will travel with a high reactive attenuation. The particular value of the filter cut-off frequency will vary somewhat with the direction of the wave with respect to the axes of the structure, but this variation will be small in structures of practical interest since the periodicity of the structure is small compared to the free-space wavelength at cut-off. Therefore, the cut-off frequency for each member of the $TE_{n0}$ class of modes will be approximately the same as that for the $TE_{10}$ mode. Thus there will be no separate responses for the higher modes. Furthermore, the filter cut-off will usually be designed to occur below the cut-off frequency of the $TE_{20}$ mode in the terminating waveguide, and hence no higher-mode pass bands can exist at all.

Another advantage of the new filter structure is that it is much easier to assemble. In the older structure having only transverse slots, the side walls must be soldered perfectly to the grooved top and bottom walls, since even a slight gap along the edges of the corrugations can introduce considerable dissipation loss and reflection loss in the pass band. In the new structure, longitudinal slots can be introduced along the sides, as shown in FIG. 2, so that solder does not have to run up the edges of the corrugations. In this case the adverse effect of a moderately imperfect soldering job will be negligible, and therefore the assembly process can be greatly simplified. In fact, excellent performance has been obtained with the new filter with its parts merely bolted together without solder. In cases where changes in width had to be used in the older structure to eliminate higher-mode responses the simplification is even greater.

Although the bosses in FIGS. 1–3 are shown as rectangular in cross-section, it is to be understood that the invention is not to be limited thereto nor is it to be limited to slots which intersect at right angles. For example, the spaced bosses may be circular, triangular, or hexagonal, etc., in cross-section and the slots may intersect at 60 degrees and still operate efficiently as a broad-band microwave filter.

Figure 5:
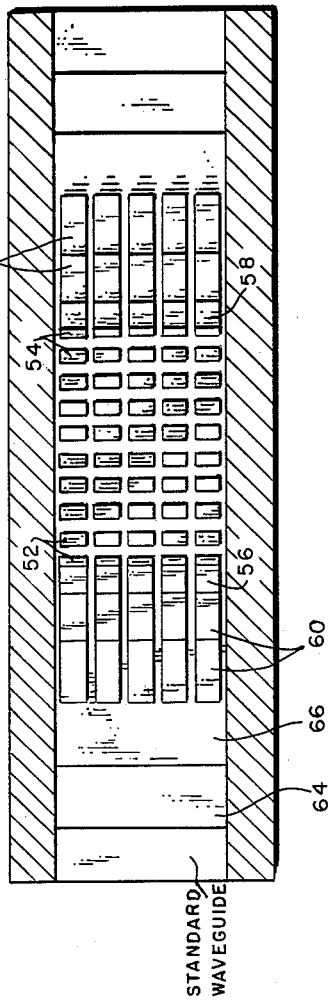
FIG. 5 is a cross-section of the filter section taken along the line 5—5 of FIG. 2.

FIGS. 4 and 5 illustrate another embodiment of a filter which is symmetrical in the E-plane. As in the filter section of FIG. 2, two identical filter portions 40 and 42 are provided with the bosses of filter portion 40 opposing the bosses of filter portion 42 and with longitudinal and transverse slots of filter portion 40 being symmetrically arranged with respect to the longitudinal and transverse slots of filter portion 42. Since both filter portions are identical, only one will be described.

Referring now to FIGS. 4 and 5, respective longitudinal rows of bosses are terminated at each end by terminating end boss sections 52 and 54, which, in turn, are terminated by end waveguide boss sections as at 56 and 58. The waveguide boss sections 56 and 58 are in turn terminated by stepped boss sections 60 and 62 which form part of the transition sections coupling an external waveguide to the filter. As shown, the respective loingitudinal slots extend through their associated terminating end sections, their associated terminating end waveguide sections and their associated stepped boss sections. The remainder of each transition section includes transverse steps 64 and 66 which couple standard waveguides to the filter input and output. The filter portions 40 and 42 are maintained in spaced relationship by means of end wall 68 and 70 as shown in FIG. 4. The terminating end boss sections and end waveguide boss sections together with the stepped transformer sections provide a suitable match between the input and output waveguides and the filter so that a good VSWR response is achieved for the filter pass band.

While there has been described what is at present considered to be the preferred embodiment of this invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A broad band microwave filter comprising a section of rectangular waveguide having a longitudinal and transverse axis, a first section comprising a plurality of spaced conductive bosses within said waveguide section and extending upwardly from one wide surface thereof, a second section comprising a plurality of spaced conductive bosses extending downwardly from the other wide surface of said waveguide section in mutual opposition to and symmetrically arranged with said upwardly extending bosses, the bosses in said first and second sections being arranged colinearly in a plurality of spaced rows, said rows being parallel to said longitudinal and transverse axes and coextensive with the width of said waveguide section, the free ends of said oppositely arranged bosses being spaced from each other along the narrow dimension of said waveguide section, and a first and second transition section respectively terminating the ends of said first and second sections.

References Cited in the file of this patent

UNITED STATES PATENTS 2,888,598     Palluel _____ May 26, 1959
2,912,695     Cutler _____ Nov. 10, 1959

OTHER REFERENCES

Greene: "Corrugated-Waveguide Band-Pass Filters," Electronics Magazine, vol. 24, No. 7, pages 117–119, July 1951.